(12) United States Patent
Danielson et al.

(10) Patent No.: US 9,787,704 B2
(45) Date of Patent: Oct. 10, 2017

(54) ANOMALY DETECTION BASED ON CLUSTER TRANSITIONS

(71) Applicants: Debra J. Danielson, Skillman, NJ (US); Steven L. Greenspan, Scotch Plains, NJ (US); James D. Reno, Scotts Valley, CA (US); Prashant Parikh, Holtsville, NY (US)

(72) Inventors: Debra J. Danielson, Skillman, NJ (US); Steven L. Greenspan, Scotch Plains, NJ (US); James D. Reno, Scotts Valley, CA (US); Prashant Parikh, Holtsville, NY (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/641,279

(22) Filed: Mar. 6, 2015

(65) Prior Publication Data
US 2016/0261622 A1 Sep. 8, 2016

(51) Int. Cl.
*H04L 29/06* (2006.01)
*H04L 29/08* (2006.01)

(52) U.S. Cl.
CPC ...... *H04L 63/1425* (2013.01); *H04L 67/1095* (2013.01)

(58) Field of Classification Search
CPC .......... H04L 63/1425; H04L 67/1095
See application file for complete search history.

(56) References Cited

U.S. PATENT DOCUMENTS

2007/0011480 A1* 1/2007 Banginwar ........... G06F 1/3203
713/323
2015/0235152 A1* 8/2015 Eldardiry ........... G06Q 10/0635
705/7.28

* cited by examiner

*Primary Examiner* — Eleni Shiferaw
*Assistant Examiner* — Mary Li
(74) *Attorney, Agent, or Firm* — Baker Botts L.L.P.

(57) ABSTRACT

Systems and methods may include receiving first data of components, which may represent performance characteristics of the components at a first time. The systems and methods may include performing a first cluster analysis of the first data to identify clusters of the components with similar characteristics. The systems and methods may include receiving second data of the components, which may represent performance characteristics of the components at a second time. The systems and methods may include performing a second cluster analysis of the second data to identify clusters of the components with similar characteristics. The systems and methods may include determining whether a component transitioned from a cluster identified in the first cluster analysis to a different cluster identified in the second cluster analysis. The systems and methods may include determining that an anomaly occurred in response to determining that the component transitioned from the cluster to the different cluster.

17 Claims, 6 Drawing Sheets

ANOMALY DETECTION BASED ON CLUSTER TRANSITIONS

BACKGROUND

The present disclosure relates to infrastructure management and, more specifically, to systems and methods for anomaly detection based on cluster transitions.

As the so-called Internet of Things expands, an increasing number of smart devices have been developed to interconnect within the existing Internet infrastructure or other networks. Such devices may be used to collect information and to automate a growing number of important tasks in a variety of fields.

BRIEF SUMMARY

According to an aspect of the present disclosure, a method may include several processes. In particular, the method may include receiving first performance data of several components in a system. The first performance data may represent performance characteristics of the components in a first time period. In addition, the method may include performing a first cluster analysis of the first performance data to identify clusters of the components with similar performance characteristics in the first time period. The method also may include receiving second performance data of the components. The second performance data may represent performance characteristics of the components in a second time period. Further, the method may include performing a second cluster analysis of the second performance data to identify clusters of the components with similar performance characteristics in the second time period. Moreover, the method may include determining whether a component of the components transitioned from a first cluster identified in the first cluster analysis to a second cluster identified in the second cluster analysis. The first cluster may be different from the second cluster. Further still, the method may include determining that an anomalous event has occurred in response to determining that the component transitioned from the first cluster to the second cluster.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
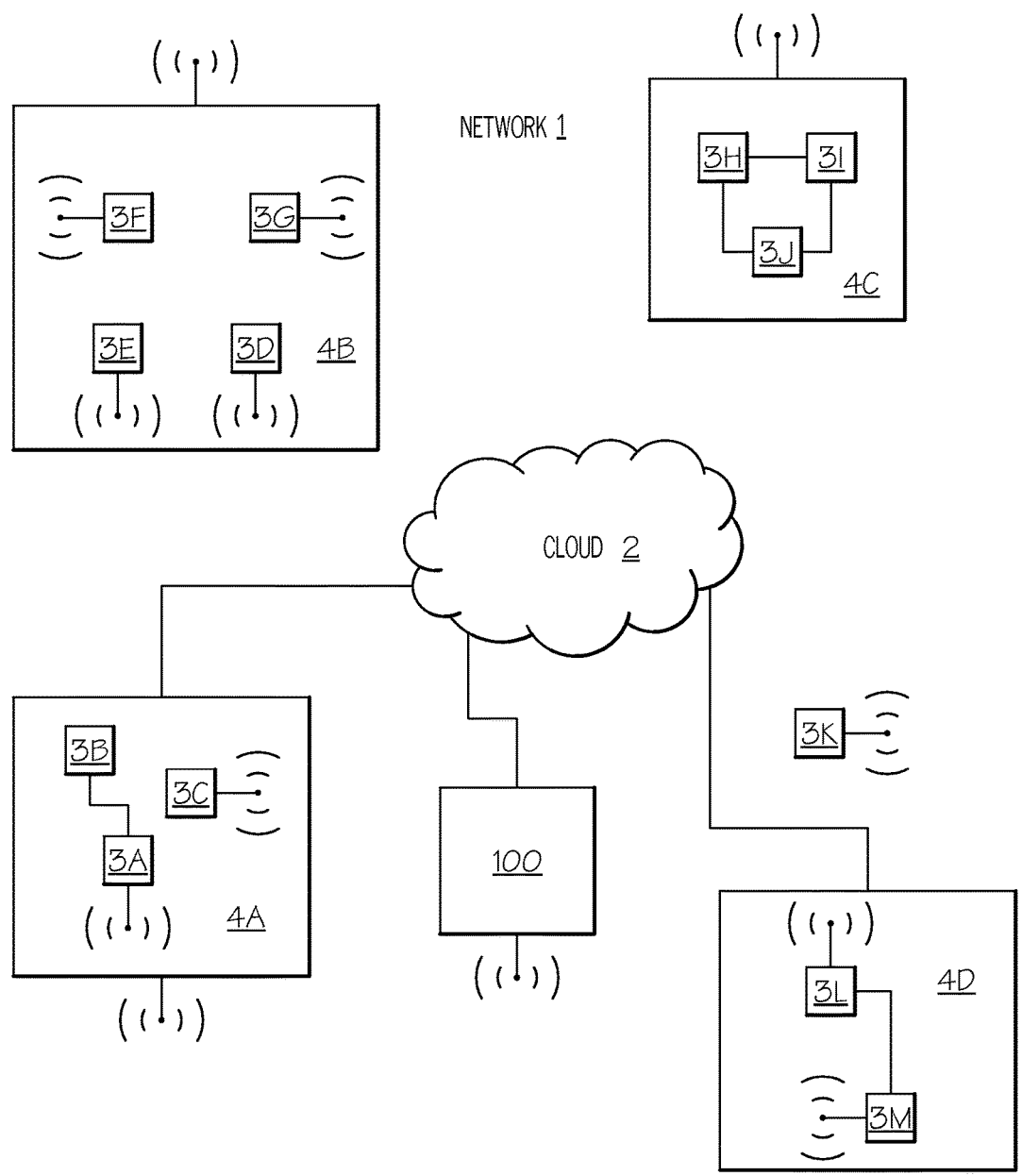
FIG. 1 is a schematic representation of a network 1 on which systems and methods for anomaly detection based on cluster transitions may be implemented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management and, more specifically, to anomaly detection based on cluster transitions, as related to managing and deploying resources in an IoT infrastructure, systems and methods disclosed herein may be related to other areas beyond the IoT and may be related to aspects of IoT other than the example implementations described herein. Systems and methods disclosed herein may be applicable to a broad range of applications that require access to networked resources and infrastructure and that are associated with various disciplines, such as, for example, research activities (e.g., research and design, development, collaboration), commercial activities (e.g., sales, advertising, financial evaluation and modeling, inventory control, asset logistics and scheduling), IT systems (e.g., computing systems, cloud computing, network access, security, service provisioning), and other activities of importance to a user or organization.

As described below in more detail, aspects of this disclosure may be described with respect to particular example implementations. For example, this disclosure often refers to the example of one or more convoys of trucks operating in one or more geographic locations for one or more organizations. Nevertheless, such example implementations are not limiting examples, but rather are provided for the purposes of explanation. Accordingly, the concepts set forth in this disclosure may be applied readily to a variety of fields and industries and should not be limited to merely the example implementations described herein.

The recent explosion of network-enabled components has presented the opportunity to monitor and study systems over a range of levels. In particular, numerous connected sensors and components are now available and may be incorporated into a variety of systems to enable the real-time monitoring of the system as a whole and the system's components on a discrete level. Such connectivity, however, also opens the door for malicious actors to improperly obtain data from these network-enabled sensors and components or even to hijack such sensors and components for their own malicious purposes.

Certain implementations disclosed herein may permit administrators to implement real-time performance monitoring, evaluation, and diagnosis of components deployed in the field, as well as real-time monitoring, evaluation, and diagnosis of data produced by such components.

In particular implementations, systems and methods disclosed herein may use performance data (e.g., telemetry data or other sensor data) received from a plurality of devices at a plurality of different points in time to identify clusters of related and/or similar devices at each of the plurality of different points in time. Such systems and methods may use this information to determine whether one or more of the plurality of devices has transitioned from a cluster to a different cluster over time, and such transitions may be used to identify anomalous events or other unexpected behaviors. In this manner, such systems and methods may dynamically learn about the devices and their environment and take proactive measures to address or otherwise correct for anomalous events.

Clusters may include groups with small distances (e.g., differences in value for one or more parameters of performance data) among the cluster members, dense areas of the data space, intervals, particular statistical distributions, or any other grouping based on similar features, properties, and/or data. In some implementations, clustering may be formulated as a multi-objective optimization problem. The appropriate clustering algorithm and parameter settings, such as the distance function to use, a density threshold, or the number of expected clusters, for example, may depend on the individual data set and intended use of the results. Clusters may be identified based on an iterative process of knowledge discovery or interactive multi-objective optimization that involves trial and failure that may often require modification and fine-tuning of data preprocessing and model parameters until the result achieves the desired properties.

Referring now to FIG. 1, a network 1 comprising a plurality of components now is disclosed. Systems and methods for anomaly detection based on cluster transitions may be implemented on network 1. Network 1 may comprise one or more clouds 2, which may be public clouds, private clouds, or community clouds. Each cloud 2 may permit the exchange of information, services, and other resources between various components that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications between components and may permit components to access various resources of network 1.

Network 1 may comprise one or more servers that may store resources thereon, host resources thereon, or otherwise make resources available. Such resources may comprise, but are not limited to, information technology services, financial services, business services, access services, other resource-provisioning services, secured files and information, unsecured files and information, accounts, and other resources desired by one or more entities. More generally, such servers may comprise, for example, one or more of general purpose computing devices, specialized computing devices, mainframe devices, wired devices, wireless devices, and other devices configured to provide, store, utilize, monitor, or accumulate resources and the like.

Network 1 may comprise one or more devices utilized by one or more consumers of provided services. The one or more service providers may provide services to the one or more consumers utilizing the one or more servers, which connect to the one or more devices via network 1. The services may comprise, for example, information technology services, financial services, business services, access services, and other resource-provisioning services. The devices may comprise, for example, one or more of general purpose computing devices, specialized computing devices, mobile devices, wired devices, wireless devices, passive devices, routers, switches, and other devices utilized by consumers of provided services.

Network 1 may comprise a plurality of systems, such as systems 4A-D. Each of the systems may comprise a plurality of components, such as devices 3A-M. Systems 4A-D may be one or more of a plurality of commercial, industrial, or consumer devices, such as cars, trucks, machinery, boats, recreational vehicles, equipment, servers, switches, refrigerators, heating systems, cooling systems, cooking instruments, timers, lighting systems, airplanes, buildings, payment terminals, computers, phones, tablets, shoes, safes, security systems, cameras, or any other conceivable device, for example.

Devices 3A-M may be one or more of a variety of devices, such as servers, consumer devices, lights, speakers, brakes, processors, instrumentation, servos, motors, cooling systems, heating systems, pumps, emissions systems, power systems, sensors (e.g., pressure sensors, temperature sensors, airflow sensors, velocity sensors, acceleration sensors, composition sensors, electrical sensors, position sensors), and combinations thereof, for example. More generally, devices 3A-M may be part of one or more systems deployed in the field or in a laboratory environment. Each of devices 3A-M may include an input/output ("I/O") device, such that each of devices 3A-M may transmit and receive information over network 1 to processing systems 100, others of devices 3A-M, and other systems or devices. Such transmitted information may include performance data (e.g., telemetry data) related to the device (e.g., position of the device, temperature near the device, air pressure near the device, environmental composition near the device, information indicating whether the device is functioning, log information identifying sources and/or recipients of information received and/or sent by the device and/or the nature of such information, information about components being monitored by the device, status information, other parameters) or to other devices (e.g., information about neighboring devices, sensor information), requests for information from other devices, and commands for other devices to perform particular functions, for example. Devices 3A-M may receive similar information from other devices. In some configurations, one or more of devices 3A-M may aggregate and process the received information and generate new information therefrom, such as summary information, forecast information, and other useful information for transmission to other devices, for example. In some configurations, components, such as device 3K, may operate independently and effectively function as a single-component system, for example.

Moreover, network 1 may comprise one or more processing system 100 that may collect and process data received from one or more components or systems within network 1, as will be described in more detail below. In some configurations, processing system 100 may be a server, a consumer device, a combination of a server and a consumer device, or any other device with the ability to collect and process data. Processing system 100 may include a single processor or a plurality of processors. In some configurations, processing system 100 may be implemented by an integrated device. In other configurations, processing system 100 may be implemented by a plurality of distributed systems residing in one or more geographic regions.

Figure 2:
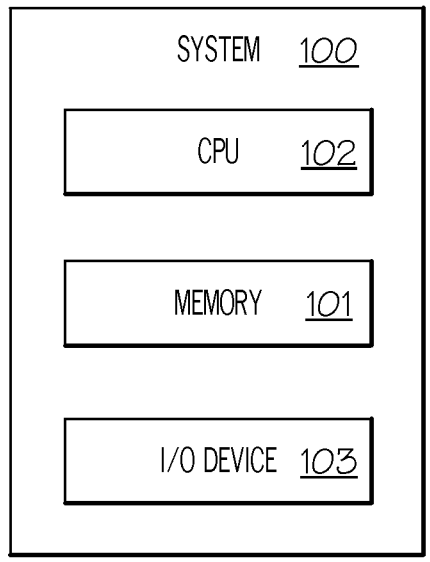
FIG. 2 is a schematic representation of a system configured to provide anomaly detection based on cluster transitions.

Referring now to FIG. 2, processing system 100, which may be configured to implement anomaly detection based on cluster transitions, now is described. System 100 may comprise a memory 101, a CPU 102, and an input and output ("I/O") device 103. Memory 101 may store computer-readable instructions that may instruct system 100 to perform certain processes. I/O device 103 may transmit data to/from cloud 2 and may transmit data to/from other devices connected to system 100. Further, I/O device 103 may implement one or more of wireless and wired communication between system 100 and other devices.

Figure 3:
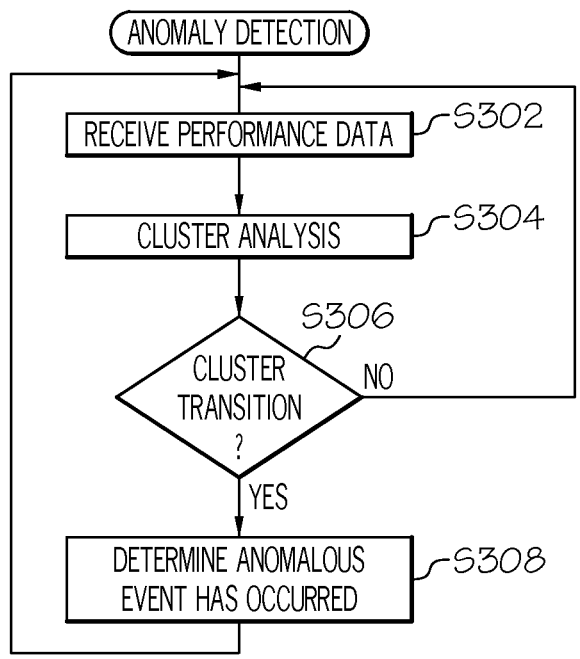
FIG. 3 illustrates an anomaly detection process.

Referring now to FIG. 3, an anomaly detection process now is described. In the anomaly detection process shown in FIG. 3, processing system 100 may receive performance data from a plurality of devices in a system, such as components 3A-3M within network 1, for example. Such system may be a local system, such as a collection of components within a data center, or a dispersed system with components spread across a variety of geographies, such as a collection of components within a plurality of data centers or a fleet of delivery trucks operating in North America, for example. System 100 may receive performance data representing the devices over a plurality of different periods of time and may perform a cluster analysis for each period of time to determine whether one or more of the devices form a cluster (e.g., a group in a similar environment or with similar behavior) with respect to one or more parameters of the performance data for such period of time. The cluster analysis may utilize one clustering algorithm, a plurality of clustering algorithms, or an ensemble approach utilizing a plurality of clustering techniques and knowledge, for example. After performing cluster analysis for performance data corresponding to at least two different times, system 100 may compare the composition of the clusters at the at least two different times to determine if one or more of the devices transitioned from one cluster to another. When such transitions have occurred, system 100 may determine that an anomalous event has occurred. In this manner, system 100 may identify anomalous events without utilizing the additional resources required to identify an appropriate level of clustering, and, thus, systems and methods disclosed herein may reduce resource consumption.

In S302, system 100 may receive performance data from a plurality of devices, such as components 3A-M in network 1, for example. The performance data for each device may include information about the device and/or related devices and may correspond to a particular period of time or point in time, such that system 100 may acquire and store a performance history for each device. In an example implementation, systems 4A-D may each represent a delivery truck. In some implementations, each delivery truck may be owned and/or operated by the same entity, such as a single delivery company, for example. In other implementations, some of the delivery trucks may be owned and/or operated by different entities, such as a plurality of delivery companies, for example. Components 3A,D,H,L may each be a temperature sensor for the respective one of systems 4A-D, and components 3B,E,I,M may each be a GPS sensor for the respective one of systems 4A-D, for example. Components 3C,F,J may each be a speed sensor for the respective one of systems 4A-C, and component 3G may be a controller for system 4B. Consequently, components 3A,D,H,L may provide local temperature data for each of systems 4A-D to others of systems 4A-D and/or to system 100, components 3B,E,I,M may provide position data for each of systems 4A-D to others of systems 4A-D and/or to system 100, components 3C,F,J may provide speed data for each of systems 4A-C to others of systems 4A-D and/or to system 100, and component 3G may provide commands or other information to one or more of systems 4A-D and/or to system 100.

In S304, system 100 may perform a cluster analysis and group the plurality of devices and/or systems including such devices into a plurality of clusters. The devices and/or systems in each cluster may have provided similar performance data (e.g., similar position information, similar speed, similar environmental conditions, similar CPU utilization) for the same period of time or at the same point in time. The cluster analysis process of S304 is described in more detail below with respect to FIG. 4, but several example implementations are described immediately below for illustrative purposes.

For example, if systems 4A-D are to be clustered based on the performance data parameter of position, system 100 may, in certain configurations, determine a granularity (described below in more detail) of clustering to be by state of operation. System 100 may analyze the performance data received in S302, including the GPS information received from components 3B,E,I,M, and determine that system 4A is located in Alaska, that systems 4B,C are located in Louisiana, and that system 4D is located in Pennsylvania, for example. Consequently, system 100 may identify three distinct clusters: a first cluster including system 4A, a second cluster including systems 4B,C, and a third cluster including system 4D. Alternatively, system 100 may, in some configurations, determine the granularity of clustering to be by country of operation, in which case system 100 may identify only one cluster (e.g., a U.S. cluster) that includes all of systems 4A-D.

More generally, the nature of clustering is that a single entity can be in multiple clusters within a single clustering configuration. For example, there could be state-level clusters and country-level clusters as described above, but there could also be city-level or regional clusters. Moreover, such clusters are not necessarily required to map to well-defined entities such as cities, states, or countries. Consequently, a pseudo "state-lever" cluster might exist that includes northern New Jersey, New York City, Long Island, and southwestern Connecticut, for example. Similarly, a pseudo "state-lever" cluster might exist for upstate New York. In other words, while some clusters may be based on predefined groups or boundaries, other clusters may be established that are different from such predefined groups or boundaries.

In another example, systems 4A-D may be clustered based on speed, which may operate as a proxy for activity. For example, components 3C,F,J and a similar speed sensor associated with system 4D may provide performance data about the speed of each of systems 4A-D to system 100 at a particular time in S302. In S304, system 100 may analyze the performance data and determine that system 4A was moving at a speed of 22 miles per hour ("MPH"), system 4B was moving at a speed of 27 MPH, system 4C was moving at a speed of 65 MPH, and system 4D was not moving (e.g., having a speed of 0 MPH) at the particular time. If system 100 is using speed merely as a proxy for activity (e.g., active or inactive), system 100 may determine the granularity to be "moving" (e.g., greater than 0 MPH) or "not moving" (e.g., 0 MPH) and cluster systems 4A-D into the following clusters: a first cluster including systems 4A-C and a second cluster including system 4D, for example. If system 100 is using speed to determine whether systems 4A-D are moving together (e.g., moving at similar speeds), system 100 may determine the granularity to based on groups of relatively similar speeds (e.g., 0 MPH, speeds between 20 MPH and 30 MPH, speeds between 60 MPH and 70 MPH) and cluster systems 4A-D into the following clusters: a first cluster including system 4A, a second cluster including systems 4B,C, and a third cluster including system 4D, for example. Thus, systems 4A-D may be clustered differently for different parameters of the performance data or for different combinations of parameters of the performance data.

After performing the cluster analysis of S304 a plurality of times to generate sets of clusters for a plurality of different points in time or periods of time, system 100 may proceed to S306 and compare the sets of clusters for each of the different points in time or periods of time to determine whether the composition of any of the clusters has changed over time. In particular, system 100 may determine whether a device (or a system including a device) has transitioned from one cluster to a different cluster. In particular implementations, when comparing clusters in S306 to determine whether cluster transitions have occurred, system 100 may compare sets of clusters based on the same parameters of performance data (e.g., only clusters based on position, only clusters based on speed, only clusters based on environmental conditions, only clusters based on both speed and position), based on the same level of granularity (e.g., the same number of clusters or the same clustering delta), and that have been determined using the same clustering algorithm (described below in more detail with reference to FIG. 4). After comparing all of the clusters for the relevant points in time or periods of time, system 100 may proceed to S308 if system 100 has determined that one or more devices (or systems including such devices) associated with the received performance data have transitioned from one cluster to a different cluster (S306: Yes). If system 100 has determined that none of the devices (or systems including such devices) associated with the received performance data have transitioned from one cluster to a different cluster (S306: No), system 100 may return to S302 and receive additional performance data corresponding to another point in time or period of time.

In S308, system 100 may determine that an anomalous event has occurred based on the occurrence of one or more cluster transitions over time (as determined in S306). In particular, system 100 may determine that the transition from one cluster to another cluster represents an anomalous event and further activate functions to identify the anomalous event, to determine a root cause of the anomalous event, and/or to correct the anomalous event. For example, if system 100 determines that one of systems 4A-D transitions from one position-based cluster (e.g., a cluster of systems in Alaska) to another position-based cluster (e.g., a cluster of systems in Louisiana) in S306, system 100 may determine that an anomalous event, such as the system being stolen, an operator impermissibly using the system for personal use, or a malfunction of the GPS sensor, for example, has occurred. Thereafter, in certain implementations, system 100 may notify an administrator or other responsible entity of the occurrence of the anomalous event and subsequently return to S302 for continued monitoring and analyses.

In some implementations, system 100 may perform further processes to confirm the occurrence of an anomalous event in S308. For example, system 100 may compare the results of cluster analyses corresponding to more than two points in time or periods of time to determine whether a device (and/or its corresponding system) is in a steady-state of transition.

As an illustrative example, a trucking company may operate a first convoy of delivery trucks that perform local deliveries within Louisiana, a second convoy of delivery trucks that perform local deliveries within Alaska, and a third convoy of delivery trucks that deliver supplies from Alaska to Louisiana. Consequently, a first cluster analysis based on position with a state-level granularity may identify "Cluster A," which includes the second and third convoys (e.g., convoys in Alaska), and "Cluster L," which includes only the first convoy (e.g., convoys in Louisiana)," at a first time. A second cluster analysis based on position with a state-level granularity may indicate that Cluster A includes only the second convoy and that Cluster L includes the first and third convoys at a second time when the third convoy has moved to Louisiana. A third cluster analysis based on position with a state-level granularity may indicate that Cluster A again includes the second and third convoys and that Cluster L again only includes the first convoy at a third time when the third convoy has returned to Alaska. A plurality of additional cluster analyses may be performed, and the results of such cluster analyses may indicate that the third convoy follows a systematic pattern of transitioning between Cluster A and Cluster L. After identifying such a systematic pattern of cluster transition, system 100 may determine that the cluster transitions do not represent anomalous events, but rather represent a steady-state of transition that is acceptable. Upon such a determination, system 100 may establish that such transitions are acceptable for the transitioning devices and may determine not to take further action (e.g., administrator notification, corrective measures, root cause analyses) in response to transitions following this pattern. In some configurations, system 100 may even identify the convoy that follows the systematic pattern of cluster transition described above as being in a new cluster (e.g., a "transition" cluster) that is in a steady state of transition, or more specifically, a cluster that is in a steady state of transition between Cluster A and Cluster L.

Similar to the creation of a "transition" cluster described above, system 100 may establish other clusters based on anomalous, but acceptable behaviors. For example, system 100 may apply "human intelligence" (e.g., information input by an administrator, predetermined rules for handling particular "anomalies," such as periodically occurring anomalous behavior) to determine that certain anomalous behavior is acceptable and should actually be defined as its own cluster. An example might be a configuration in which a truck that typically travels on a route from Pennsylvania to Ohio provides position data indicating that the truck is currently in West Virginia. An administrator may add "human intelligence" indicating that construction on the usual route caused the truck to detour through West Virginia. System 100 may use this human intelligence to determine that the truck's position in West Virginia is acceptable and may even establish a "detour" cluster for trucks that are following or will follow the detour through West Virginia.

In another illustrative example, system 100 may access an additional information sources to determine if one or more policies have changed that would result in an identified cluster transition. For example, in a first period of time, two delivery trucks may be assigned to make local deliveries within Pennsylvania, and a third delivery truck may be assigned to make local deliveries within Texas. In a second period of time, the third delivery truck may be reassigned to make local deliveries within Pennsylvania. A notice of this reassignment may be logged in an administrative database. Thus, system 100 may perform a first cluster analysis based on position with a state-level granularity for the first period of time that groups the two trucks making deliveries within Pennsylvania into a "Cluster P" and that indicates that the third truck that makes is in Texas is included in a "Cluster T." System 100 may perform a second cluster analysis based on position with a state-level granularity for the second period of time that groups all three trucks into Cluster P and indicates that no trucks are in Cluster T. Therefore, system 100 may determine that the third truck has transitioned between clusters. Nevertheless, system 100 may access the administrative database and determine that the third truck has been reassigned to another cluster. Consequently, even though system 100 previously determined that the third truck transitioned between clusters, system 100 may determine that the cluster transition was not an anomalous event because such a cluster transition would be expected based on the third truck's reassignment to a new geographic region.

Figure 4:
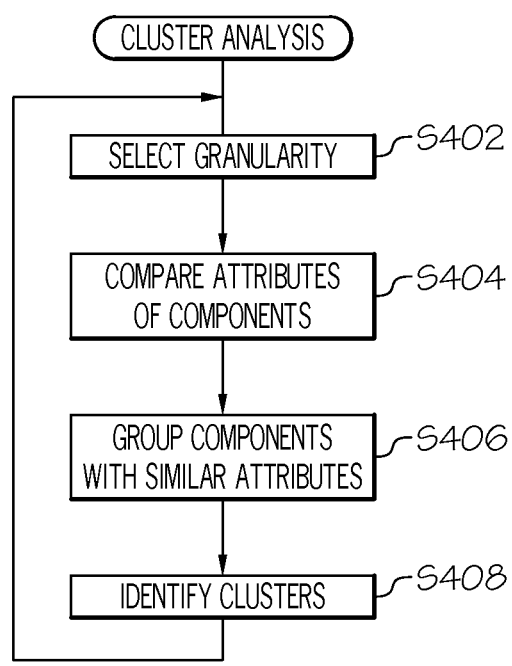
FIG. 4 illustrates a cluster analysis process.

Referring now to FIG. 4, a cluster analysis process now is described in more detail. Cluster analysis or clustering may group a set of objects in such a way that objects in the same group (e.g., a cluster) are more similar (in some sense or another) to each other than to those in other groups. Cluster analysis may be used in exploratory data mining and for statistical data analysis in many fields, such as machine learning, pattern recognition, image analysis, information retrieval, and bioinformatics, for example. Clustering may be achieved by various algorithms that differ significantly in their notion of what constitutes a cluster and how to efficiently find them. Popular notions of clusters may include groups with small distances among the cluster members, dense areas of the data space, intervals or particular statistical distributions. Consequently, clustering may be formulated as a multi-objective optimization problem. The appropriate clustering algorithm and parameter settings, such as the distance function to use, a density threshold or the number of expected clusters, for example, may depend on the individual data set and intended use of the results. Cluster analysis as such generally has not been implemented as a fully automated task due to the substantial computational resources required to define an appropriate level of clustering. Thus, cluster analysis may be implemented as an iterative process of knowledge discovery or interactive multi-objective optimization that involves trial and failure that may often require modification and fine-tuning of data preprocessing and model parameters until the result achieves the desired properties.

As noted above, one or more algorithms may be used to perform cluster analysis. Example clustering algorithms may include, but are not limited to, connectivity-based clustering (hierarchical clustering), centroid-based clustering (k-means clustering), distribution-based clustering, and density-based clustering. In some implementations, the clustering algorithm may be predetermined. In certain implementations, system 100 may determine the clustering algorithm dynamically based on the performance data, the specific performance data parameter, and/or the type of device that provided the performance data.

In S402, after one or more clustering algorithms have been established for the cluster analysis, system 100 may determine a level of granularity for the cluster analysis. Granularity may define an acceptable degree of similarity (referred to as a "clustering delta") between each device's performance data for inclusion in one cluster, for example. In other words, the level of granularity for a cluster analysis may define the extent to which the plurality of devices and/or systems are subdivided, or the extent to which devices and/or systems are grouped into clusters. In the example above with respect to a cluster analysis based on position, a low level of granularity might group systems by continent or within a 4,000 mile radius of several reference points, for example. A higher level of granularity might group systems by state or within a 200 mile radius of a greater number of reference points. A still higher level of granularity might group systems by city or within a 20 mile radius of a still greater number of reference points. Thus, as the level of granularity is increased, the number of clusters may increase and the number of systems within a cluster may decrease if the systems are well dispersed throughout the region being monitored (e.g., systems are roughly dispersed more than 20 miles from one another in this example). Nevertheless, if the systems are not well dispersed (e.g., systems are highly-concentrated within 20 miles from one another in this example), it may be necessary to increase the level of granularity significantly to identify an increased number of clusters. Although the foregoing describes granularity with respect to position, the concept of granularity may be readily applied to parameters of performance data other than position. In fact, system 100 may select a level of granularity for each parameter of the performance data being analyzed by the cluster analysis process.

In some configurations, granularity may define the number of clusters to be established in the cluster analysis for a particular set of performance data. Consequently, a higher level of granularity may establish more clusters than a lower level of granularity applied to the same parameter (or combination of parameters) of performance data using the same clustering algorithm. When granularity is used in this manner, the clustering delta may be determined from the selected level of granularity.

In S404, system 100 may initiate the selected clustering algorithm(s) and perform the process of clustering the performance data for each performance data parameter based on the level(s) of granularity selected in S402. In particular, system 100 may, for each parameter of performance data, compare the value of the parameter representing a particular point in time or period of time for each device to determine whether the values of such parameter for one or more devices are similar. For example, if the parameter being analyzed by the cluster analysis is position and the granularity is a 10 mile radius, system 100 may determine that the position information of two devices disposed within 2 miles of one another is similar, whereas system 100 may determine that the position information of two devices disposed within 30 miles of one another is not similar. The similarity criteria may be determined based on a combination of the clustering algorithm being used and the selected level of granularity.

In S406, system 100 may determine clusters for each parameter of performance data being analyzed by, for each parameter, grouping systems having similar values for the parameter at the same time in accordance with the comparisons performed in S404. Thus, returning to the example above, the two devices disposed within 2 miles of one another may be grouped into the same cluster based on position, and the two devices disposed within 30 miles of one another may be grouped into different clusters based on position.

In S408, after grouping all of the systems with similar components in S406, system 100 may, for each parameter of performance data, identify each of the clusters formed by a group of devices and associate each device (and/or system associated with such device) with the cluster in which such device is grouped. Thus, each device (and/or system associated with such device) may be associated with a specific cluster for each parameter of performance data. In some implementations, one or more clusters may include only one device (and/or system associated with such device) if other devices do not have performance data with similar values. After identifying the clusters in S408, system 100 may return to S402 and perform the cluster analysis at another level of granularity, such that clusters may be determined for a plurality of levels of granularity.

Figure 5A:
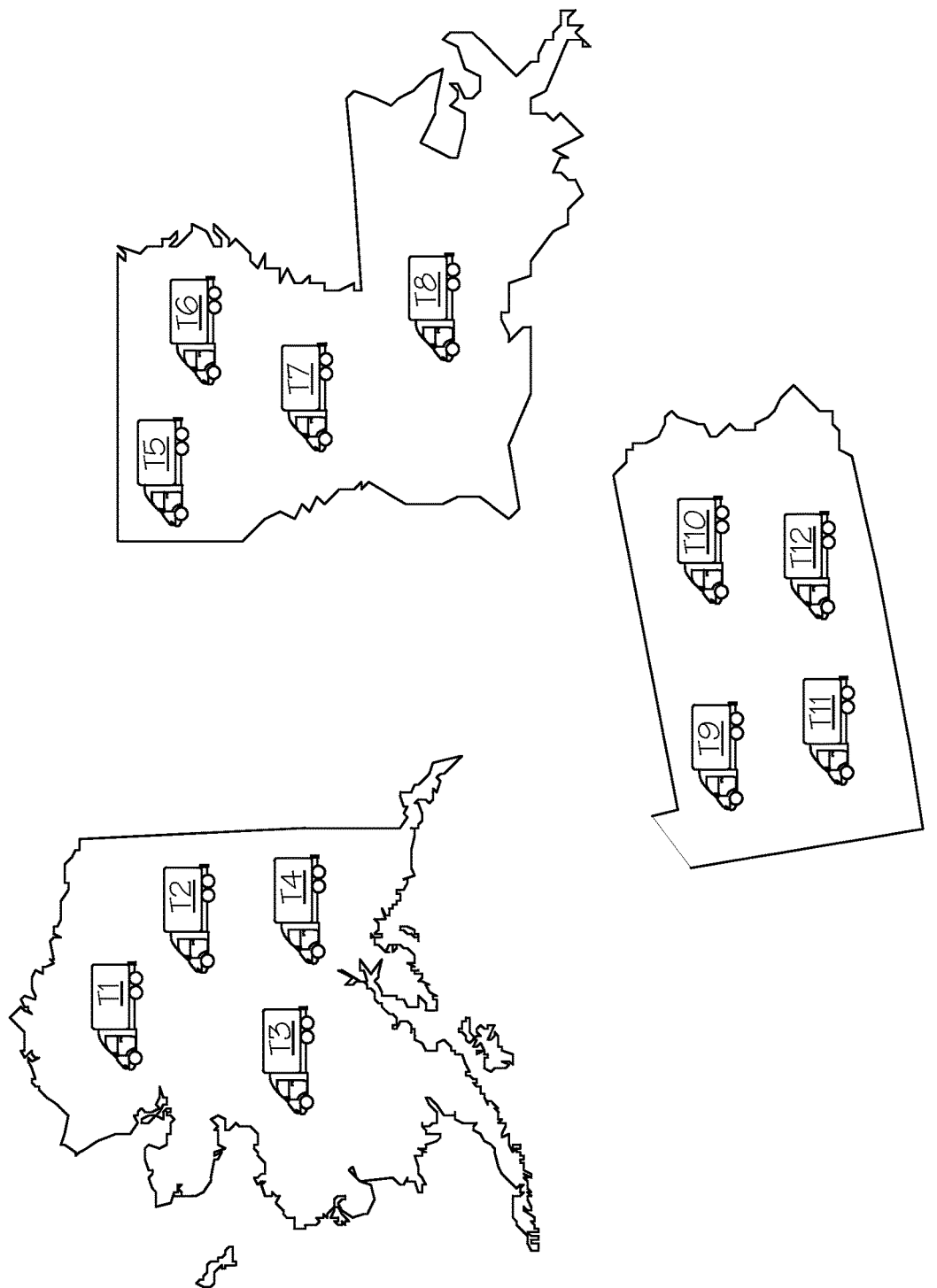
FIG. 5A is a schematic representation of components operating in various locales.
Figure 5B:
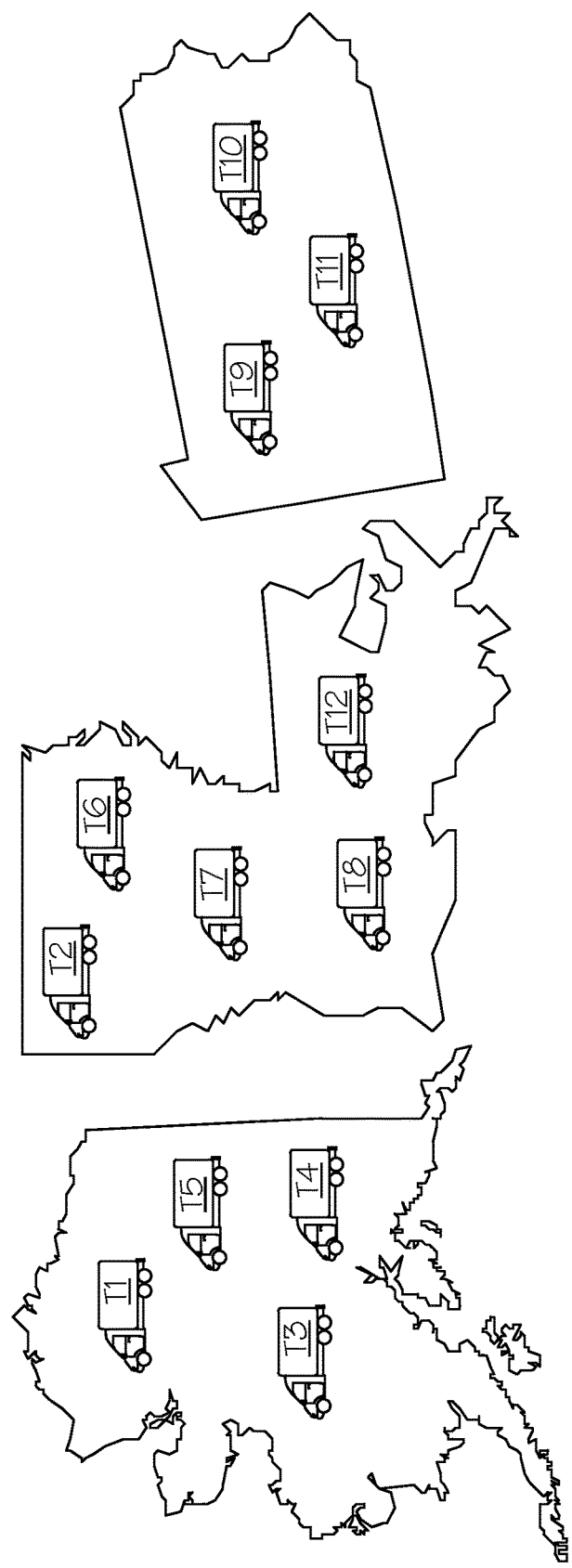
FIG. 5B is a schematic representation of the components operating in various locales after one or more transition event occurs.
Figure 5C:
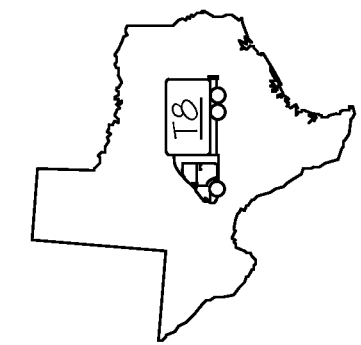
FIG. 5C is a schematic representation of the components operating in various locales after one or more other transition event occurs.
Figure 5C:
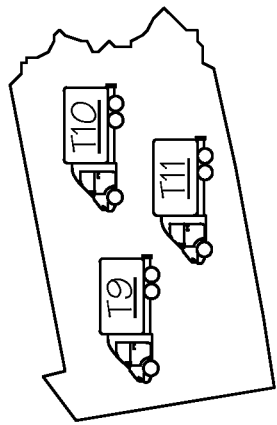
Figure 5C:
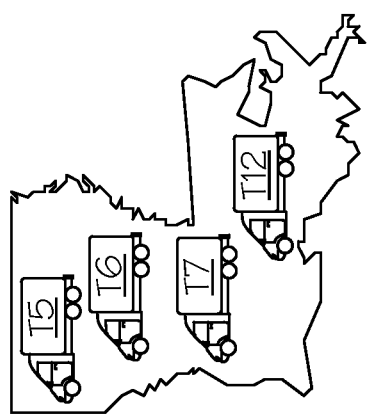
Figure 5C:
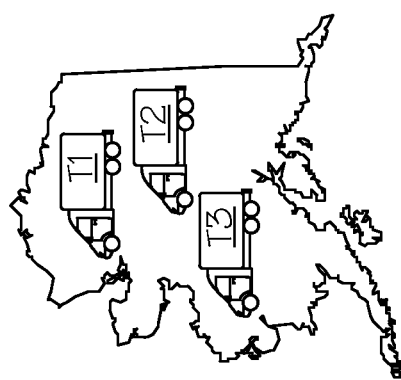

Referring now to FIGS. 5A-5C, anomaly detection and cluster analysis processes now are described with respect to a schematic illustration of components operating in various locales and undergoing position-based cluster transitions. FIGS. 5A-5C represent an example implementation of the systems in methods disclosed herein in which a plurality of delivery trucks T1-T12 operate in various geographic regions: Alaska, Louisiana, Pennsylvania, and Texas. Each of trucks T1-T12 may include a GPS sensor device that tracks the position of such truck and may transmit performance data including the truck position to system 100. Trucks T1-T12 may include other sensors that may transmit other performance data to system 100 for additional cluster analysis and anomaly detection processes based on other performance data parameters.

As shown in FIG. 5A, at a first point in time, trucks T1-T4 may initially be operating within Alaska, trucks T5-T8 may initially be operating within Louisiana, and trucks T9-T12 may initially be operating within Pennsylvania. Consequently, system 100 may receive position information representing the first point in time from each of trucks T1-T12. System 100 may perform a first cluster analysis based on position at a state-level of granularity and determine that each of trucks T1-T4 are in "Cluster A," that each of trucks T5-T8 are in "Cluster L," and that each of trucks T9-T12 are in "Cluster P."

As shown in FIG. 5B, at a second point in time, truck T5 may have moved from Louisiana to Alaska and be operating in Alaska, truck T2 may have moved from Alaska to Louisiana and be operating in Louisiana, and truck T12 may have moved from Pennsylvania to Louisiana and be operating in Louisiana. Consequently, system 100 may receive position information representing the second point in time from each of trucks T1-T12. System 100 may perform a second cluster analysis based on position at a state-level of granularity and determine that each of trucks T1 and T3-T5 are in Cluster A, that each of trucks T2, T6-T8, and T12 are in Cluster L, and that each of trucks T9-T11 are in Cluster P. Thus, system 100 may continue performing the anomaly detection process and determine that truck T5 transitioned from Cluster L to Cluster A, that truck T2 transitioned from Cluster A to Cluster L, and that truck T12 transitioned from Cluster P to Cluster L. Consequently, system 100 may determine that an anomalous event may have occurred with respect to each of trucks T2, T5, and T12, such as for example, theft, GPS sensor malfunction, or other unexpected activity.

In some implementations, system 100 may access an administrative log to determine whether one or more of trucks T2, T5, and T12 were reassigned to their new location or whether one or more of trucks T2, T5, and T12 are scheduled for interstate deliveries. In such cases, if the transition for a truck is appropriate in view of the administrative log, then system 100 may determine that an anomalous event has not occurred with respect to such truck. In other implementations, system 100 may wait to receive performance data from additional points in time and to perform additional cluster analyses before determining whether an anomalous event has occurred.

As shown in FIG. 5C, at a third point in time, truck T4 may have stopped providing performance data, truck T2 may have returned to Alaska from Louisiana and be operating in Alaska, truck T5 may have returned to Louisiana from Alaska and be operating in Louisiana, and truck T8 may have moved from Louisiana to Texas and be operating in Texas. Consequently, system 100 may receive position information representing the third point in time from each of trucks T1-T3 and T5-T12. System 100 may perform a third cluster analysis based on position at a state-level of granularity and determine that each of trucks T1-T3 are in Cluster A, that each of trucks T5-T7 and T12 are in Cluster L, that each of trucks T9-T11 are in Cluster P, and that truck T8 is in "Cluster T." Thus, system 100 may continue performing the anomaly detection process and determine that truck T2 transitioned back to Cluster A from Cluster L, that truck T4 transitioned out of Cluster A (because it stopped transmitting performance data), that truck T5 transitioned back to Cluster L from Cluster A, and that truck T8 transitioned from Cluster L to Cluster T. Consequently, system 100 may determine that an anomalous event may have occurred with respect to each of trucks T2, T4, T5, and T8, such as for example, theft, GPS sensor malfunction, or other unexpected activity.

Similar to FIG. 5B, in some implementations, system 100 may access an administrative log to determine whether one or more of trucks T2, T4, T5, and T8 were reassigned to their new location or whether one or more of trucks T2, T4, T5, and T8 are scheduled for interstate deliveries. In such cases, if the transition for a truck is appropriate in view of the administrative log, then system 100 may determine that an anomalous event has not occurred with respect to such truck. In other implementations, for example, system 100 may use information from past cluster analysis to determine whether trucks T2, T4, T5, and T8 have undergone similar or related cluster transitions in the past. For example, system 100 may determine that truck T2 previously transitioned from Cluster A to Cluster L and has now transitioned back from Cluster L to Cluster A and that truck T5 previously transitioned from Cluster L to Cluster A and has now transitioned back from Cluster A to Cluster L. Accordingly, system 100 may determine that each of trucks T2 and T5 are in a steady state of transition (e.g., each truck is responsible for interstate delivery) and may determine that an anomalous event has not actually occurred with respect to trucks T2 and T5.

The anomaly detection and cluster analysis processes described with respect to FIGS. 5A-5C are simplified examples that rely primarily on position information, such as that provided by a GPS sensor, and are provided for the purpose of simplifying the explanation of these processes. Nevertheless, this disclosure is not limited to such examples, and anomaly detection and cluster analysis processes contemplated hereby may cluster devices and/or systems based on a plurality of performance data parameters (e.g., temperature, speed, operational state, driver alertness, resource utilization, pressure, humidity, weather conditions, reliability, and other performance data parameters) alone or in combination.

For example, an alternative implementation may employ anomaly detection that utilizes a plurality of parameters of performance data. In one such example implementation, 100 trucks may be providing performance data to system 100. Each truck may include 4 smart tire pressure gauges, and the same model of tire pressure gauge may be installed in all of the 100 trucks, but the various tire pressure gauges may vary in age. Clusters may be established based on the reliability of the tire pressure gauges: tire pressure gauges that work well may belong to Cluster A and tire pressure gauges that require maintenance work may belong to Cluster B. At any given time, roughly 5% of the tire pressure gauges may be in Cluster B (until such gauges are repaired or upgraded). A third cluster, Cluster C, may also be defined as tire pressure gauges that might have been tampered with.

Continuing the example above, system 100 may determine whether a tire pressure gauge in Cluster A has transitioned to one of Cluster B or Cluster C by requesting replies to queries from components that are simultaneously undergoing similar physical conditions (e.g., components traveling in the same convoy, which may be determined based on position data or other parameters). For example, system 100 may ask: "what is your current reading" from a set of Cluster A components undergoing similar environmental stress and from a set of known Cluster B components undergoing similar environmental stress. System 100 may use the responses from such queries to derive data on response times, response variability, and/or other metrics regarding the responses. System 100 then may compare the properties and/or behavior of a target component to the statistical properties and/or behavior of Cluster A and Cluster B. If the target component is currently in Cluster A but is behaving more like components in Cluster B (e.g., the behavior and/or properties of the component are more similar to a characteristic value for Cluster B than to a characteristic value for Cluster A or Cluster C), then system 100 may classify that as a transition to B and issue a maintenance notification, for example. If the target component is currently in Cluster A but is behaving not behaving like components in Cluster A or Cluster B (e.g., the behavior and/or properties of the component are not similar to the characteristic value for Cluster A or Cluster B), system 100 may re-classify the component as a potential Cluster C member.

In some implementations, system 100 may perform a process to determine which parameters of performance data are meaningful. For example, system 100 may perform a plurality of different cluster analyses based on different parameters or different combinations of parameters to determine which parameters actually produce meaningful cluster information. As an example, parameters or combinations of parameters that generate only one or two clusters in the cluster analysis may not provide much useful information and therefore may not be useful in cluster analyses. Nevertheless, other parameters or combinations of parameters that generate a plurality of cluster in the cluster analysis may provide useful information about the clustered components and therefore may be useful in cluster analyses. Consequently, system 100 may determine that such other parameters or combinations of parameters may be meaningful and may only perform further cluster analyses using such other parameters or combinations of parameters.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   receiving first performance data of a plurality of components in a system, the first performance data representing performance characteristics of the plurality of components in a first time period;
   performing a first cluster analysis of the first performance data, the first cluster analysis comprising:
      identifying clusters of the plurality of components with similar performance characteristics in the first time period;
   receiving second performance data of the plurality of components, the second performance data representing performance characteristics of the plurality of components in a second time period;
   performing a second cluster analysis of the second performance data, the second cluster analysis comprising:
      identifying clusters of the plurality of components with similar performance characteristics in the second time period;
   determining whether a component of the plurality of components transitioned from a first cluster to a second cluster, the first cluster being different from the second cluster, and the determining comprising:
      determining that the component transitioned from the first cluster to the second cluster if the component was identified as being in the first cluster in the first cluster analysis and was identified as being in the second cluster in the second cluster analysis; and
      determining that the component did not transition from the first cluster to the second cluster if the component was identified as being in the first cluster in the first cluster analysis and was identified as being in the first cluster in the second cluster analysis; and
   in response to determining that the component transitioned from the first cluster to the second cluster, determining that an anomalous event has occurred;
   receiving third performance data of the plurality of components, the third performance data representing performance characteristics of the plurality of components in a third time period;
   performing a third cluster analysis of the third performance data, the third cluster analysis comprising:
      identifying clusters of the plurality of components with similar performance characteristics representing in the third time period;
   determining whether the component transitioned from the second cluster to a third cluster, the third cluster being different from the second cluster, and the determining comprising:
      determining that the component transitioned from the second cluster to the third cluster if the component was identified as being in the second cluster in the second cluster analysis and was identified as being in the third cluster in the third cluster analysis; and
   in response to determining that the component transitioned from the second cluster to the third cluster:
      determining that the component is in a steady state of transition, and
      determining whether the component is a member of a transition cluster that is in a steady state of transition between the first cluster and the third cluster.

2. The method of claim 1,
   wherein performing the first cluster analysis comprises clustering the plurality of components at a first level of granularity,
   wherein performing the second cluster analysis comprises clustering the plurality of components at a second level of granularity, and
   wherein the first level of granularity is the same level of granularity as the second level of granularity, such that the first cluster and the second cluster are clusters at the same level of granularity.

3. The method of claim 1,
   wherein performing the first cluster analysis comprises:
      determining that the component has similar performance characteristics to another component of the plurality of components based on the first performance data; and
      in response to determining that the component has similar performance characteristics to the other component, determining that the component and the other component are members of the first cluster, and
   wherein performing the second cluster analysis comprises:
      determining whether the component has similar performance characteristics to the other component based on the second performance data; and
      in response to determining that the component has similar performance characteristics to the other component, determining that the component and the other component are members of the first cluster; and
      in response to determining that the component does not have similar performance characteristics to the other component, determining that the component is a member of the second cluster.

4. The method of claim 1,
wherein performing the first cluster analysis comprises clustering the plurality of components at each of a plurality of levels of granularity,
wherein performing the second cluster analysis comprises clustering the plurality of components at each of the plurality of levels of granularity, and
wherein determining whether the component transitioned from the first cluster to the second cluster comprises determining whether the component transitioned from the first cluster to the second cluster based on clustering the plurality of components at the same level of granularity in both the first cluster analysis and the second cluster analysis.

5. The method of claim 1,
wherein performing the first cluster analysis of the first performance data comprises:
  identifying a cluster of components of the plurality of components with similar performance characteristics for a first parameter of the first performance data in the first time period, such cluster being a first parameter cluster; and
  identifying a cluster of components of the plurality of components with similar performance characteristics for a second parameter of the first performance data in the first time period, such cluster being the first cluster,
wherein the method further comprises:
  requesting data for a particular parameter of performance data from the components identified as the first parameter cluster, the particular parameter being the same parameter as the second parameter of the first performance data,
wherein receiving the second performance data of the plurality of components comprises:
  receiving as the second performance data the data for the particular parameter from the components identified as the first parameter cluster, and
wherein performing the second cluster analysis of the second performance data comprises:
  identifying a plurality of clusters of components of the plurality of components with similar performance characteristics for the particular parameter of performance data in the second time period, such plurality of clusters comprising the first cluster and the second cluster.

6. The method of claim 1, further comprising:
accessing additional information, the additional information indicating that transitioning from the first cluster to the second cluster is acceptable behavior for the component of the plurality of components, and
in response to accessing the additional information, determining that the anomalous event is an acceptable event.

7. A system comprising:
a memory; and
a processing system configured to:
receive first performance data of a plurality of components in a system, the first performance data performance characteristics of the plurality of components in a first time period;
perform a first cluster analysis of the first performance data, the first cluster analysis comprising:
  identifying clusters of the plurality of components with similar performance characteristics in the first time period;
receive second performance data of the plurality of components, the second performance data representing performance characteristics of the plurality of components in a second time period;
perform a second cluster analysis of the second performance data, the second cluster analysis comprising:
  identifying clusters of the plurality of components with similar performance characteristics in the second time period;
determine whether a component of the plurality of components transitioned from a first cluster to a second cluster, the first cluster being different from the second cluster, and the determining comprising:
  determining that the component transitioned from the first cluster to the second cluster if the component was identified as being in the first cluster in the first cluster analysis and was identified as being in the second cluster in the second cluster analysis; and
  determining that the component did not transition from the first cluster to the second cluster if the component was identified as being in the first cluster in the first cluster analysis and was identified as being in the first cluster in the second cluster analysis; and
in response to determining that the component transitioned from the first cluster to the second cluster, determine that an anomalous event has occurred;
receiving third performance data of the plurality of components, the third performance data representing performance characteristics of the plurality of components in a third time period;
performing a third cluster analysis of the third performance data, the third cluster analysis comprising:
  identifying clusters of the plurality of components with similar performance characteristics in the third time period;
determining whether the component transitioned from the second cluster to a third cluster, the third cluster being different from the second cluster, and the determining comprising:
  determining that the component transitioned from the second cluster to the third cluster if the component was identified as being in the second cluster in the second cluster analysis and was identified as being in the third cluster in the third cluster analysis; and
in response to determining that the component transitioned from the second cluster to the third cluster:
  determining that the component is in a steady state of transition, and
  determining whether the component is a member of a transition cluster that is in a steady state of transition between the first cluster and the third cluster.

8. The system according to claim 7,
wherein, when performing the first cluster analysis, the processing system is configured to cluster the plurality of components at a first level of granularity,
wherein, when performing the second cluster analysis, the processing system is configured to cluster the plurality of components at a second level of granularity, and
wherein the first level of granularity is the same level of granularity as the second level of granularity, such that the first cluster and the second cluster are clusters at the same level of granularity.

9. The system according to claim 7,
wherein, when performing the first cluster analysis, the processing system is configured to:
  determine that the component has similar performance characteristics to another component of the plurality of components based on the first performance data; and in response to determining that the component has similar performance characteristics to the other component, determine that the component and the other component are members of the first cluster, and wherein, when performing the second cluster analysis, the processing system is configured to:

determine whether the component has similar performance characteristics to the other component based on the second performance data; and in response to determining that the component has similar performance characteristics to the other component, determine that the component and the other component are members of the first cluster; and in response to determining that the component does not have similar performance characteristics to the other component, determine that the component is a member of the second cluster.

10. The system according to claim 7, wherein, when performing the first cluster analysis, the processing system is configured to cluster the plurality of components at each of a plurality of levels of granularity, wherein, when performing the second cluster analysis, the processing system is configured to cluster the plurality of components at each of the plurality of levels of granularity, and wherein, when determining whether the component transitioned from the first cluster to the second cluster, the processing system is configured to determine whether the component transitioned from the first cluster to the second cluster based on clustering the plurality of components at the same level of granularity in both the first cluster analysis and the second cluster analysis.

11. The system according to claim 7, wherein, when performing the first cluster analysis of the first performance data, the processing system is configured to:

identify a cluster of components of the plurality of components with similar performance characteristics for a first parameter of the first performance data in the first time period, such cluster being a first parameter cluster; and identify a cluster of components of the plurality of components with similar performance characteristics for a second parameter of the first performance data in the first time period, such cluster being the first cluster, wherein the processing system is further configured to:

request data for a particular parameter of performance data from the components identified as the first parameter cluster, the particular parameter being the same parameter as the second parameter of the first performance data, wherein, when receiving the second performance data of the plurality of components, the processing system is configured to:

receive as the second performance data the data for the particular parameter from the components identified as the first parameter cluster, and wherein, when performing the second cluster analysis of the second performance data, the processing system is configured to:

identify a plurality of clusters of components of the plurality of components with similar performance characteristics for the particular parameter of performance data in the second time period, such plurality of clusters comprising the first cluster and the second cluster.

12. The system according to claim 7, wherein the processing system is further configured to:

access additional information, the additional information indicating that transitioning from the first cluster to the second cluster is acceptable behavior for the component of the plurality of components, and in response to accessing the additional information, determine that the anomalous event is an acceptable event.

13. A computer program product comprising:

a non-transitory computer readable storage medium having computer readable program code embodied therewith, the computer readable program code comprising:

computer readable program code configured to receive first performance data of a plurality of components in a system, the first performance data representing performance characteristics of the plurality of components in a first time period;

computer readable program code configured to perform a first cluster analysis of the first performance data, the first cluster analysis comprising:

identifying clusters of the plurality of components with similar performance characteristics in the first time period;

computer readable program code configured to receive second performance data of the plurality of components, the second performance data representing performance characteristics of the plurality of components in a second time period;

computer readable program code configured to perform a second cluster analysis of the second performance data, the first cluster analysis comprising:

identifying clusters of the plurality of components with similar performance characteristics in the second time period;

computer readable program code configured to determine whether a component of the plurality of components transitioned from a first cluster to a second cluster, the first cluster being different from the second cluster, and the determining comprising:

determining that the component transitioned from the first cluster to the second cluster if the component was identified as being in the first cluster in the first cluster analysis and was identified as being in the second cluster in the second cluster analysis; and determining that the component did not transition from the first cluster to the second cluster if the component was identified as being in the first cluster in the first cluster analysis and was identified as being in the first cluster in the second cluster analysis; and computer readable program code configured to, in response to determining that the component transitioned from the first cluster to the second cluster, determine that an anomalous event has occurred;

computer readable program code configured to receive third performance data of the plurality of components, the third performance data representing performance characteristics of the plurality of components in a third time period;

computer readable program code configured to perform a third cluster analysis of the third performance data, the third cluster analysis comprising:

identifying clusters of the plurality of components with similar performance characteristics in the third time period;

computer readable program code configured to determine whether the component transitioned from the second cluster to a third cluster, the third cluster being different from the second cluster, and the determining comprising:
  determining that the component transitioned from the second cluster to the third cluster if the component was identified as being in the second cluster in the second cluster analysis and was identified as being in the third cluster in the third cluster analysis; and
computer readable program code configured to, in response to determining that the component transitioned from the second cluster to the third cluster:
  determine that the component is in a steady state of transition; and
  determine whether the component is a member of a transition cluster that is in a steady state of transition between the first cluster and the third cluster.

14. The computer program product of claim 13,
wherein the computer readable program code configured to perform the first cluster analysis comprises:
  computer readable program code configured to cluster the plurality of components at a first level of granularity,
wherein the computer readable program code configured to perform the second cluster analysis comprises:
  computer readable program code configured to cluster the plurality of components at a second level of granularity, and
  wherein the first level of granularity is the same level of granularity as the second level of granularity, such that the first cluster and the second cluster are clusters at the same level of granularity.

15. The computer program product of claim 13,
wherein the computer readable program code configured to perform the first cluster analysis comprises:
  determining that the component has similar performance characteristics to another component of the plurality of components based on the first performance data; and
  in response to determining that the component has similar performance characteristics to the other component, determining that the component and the other component are members of the first cluster, and
wherein the computer readable program code configured to perform the second cluster analysis comprises:
  computer readable program code configured to determine whether the component has similar performance characteristics to the other component based on the second performance data; and
  computer readable program code configured to, in response to determining that the component has similar performance characteristics to the other component, determine that the component and the other component are members of the first cluster; and
  computer readable program code configured to, in response to determining that the component does not have similar performance characteristics to the other component, determine that the component is a member of the second cluster.

16. The computer program product of claim 13,
wherein the computer readable program code configured to perform the first cluster analysis comprises:
  computer readable program code configured to cluster the plurality of components at each of a plurality of levels of granularity,
wherein the computer readable program code configured to perform the second cluster analysis comprises:
  computer readable program code configured to cluster the plurality of components at each of the plurality of levels of granularity, and
wherein the computer readable program code configured to determine whether the component transitioned from the first cluster to the second cluster comprises:
  computer readable program code configured to determine whether the component transitioned from the first cluster to the second cluster based on clustering the plurality of components at the same level of granularity in both the first cluster analysis and the second cluster analysis.

17. The computer program product of claim 13, wherein the computer program product further comprises:
  computer readable program code configured to access additional information, the additional information indicating that transitioning from the first cluster to the second cluster is acceptable behavior for the component of the plurality of components, and
  computer readable program code configured to, in response to accessing the additional information, determine that the anomalous event is an acceptable event.

* * * * *